J. R. SANBORN.
MICA BUILDING MACHINE.
APPLICATION FILED AUG. 10, 1910. RENEWED MAY 14, 1912.
1,074,576.                                     Patented Sept. 30, 1913.
                                                    3 SHEETS—SHEET 1.
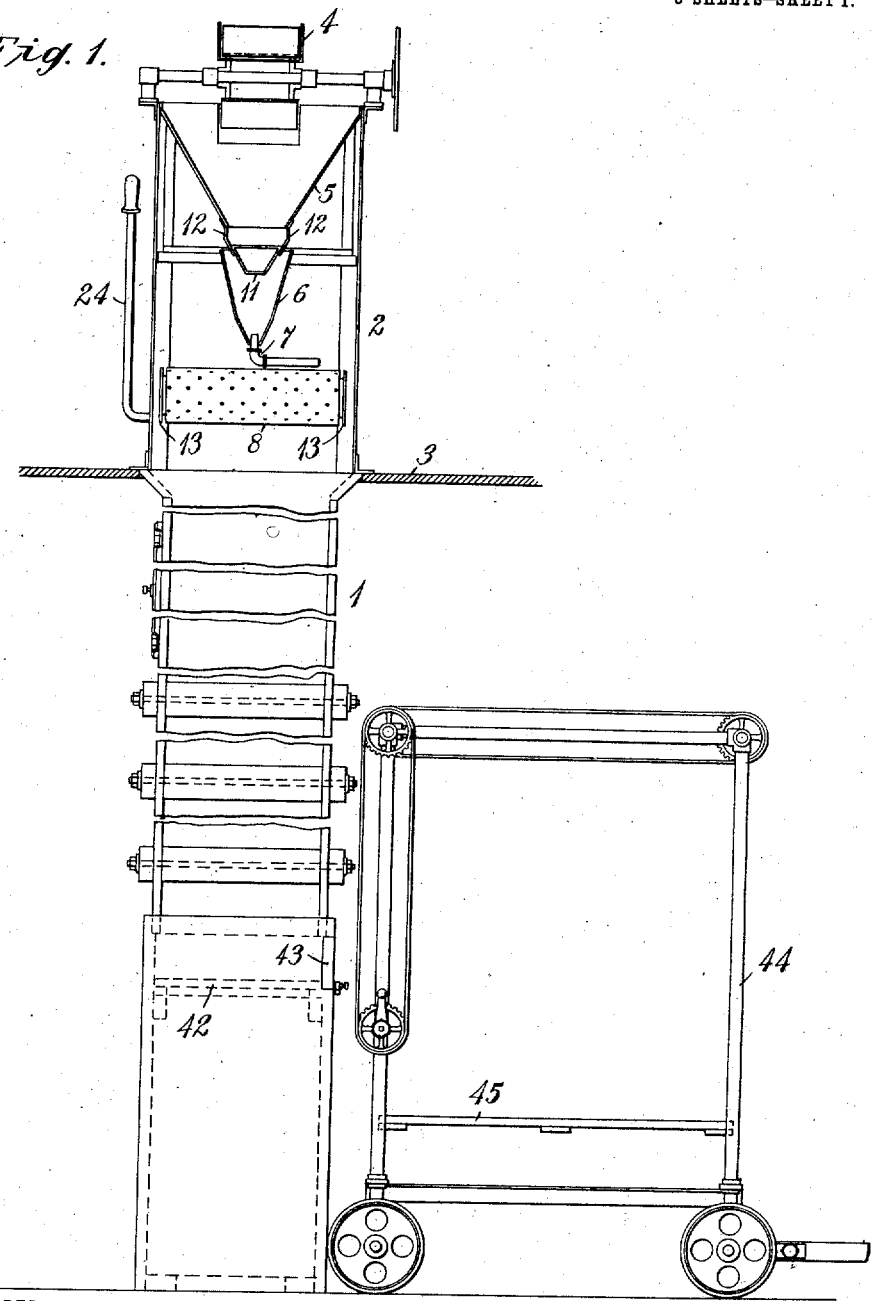

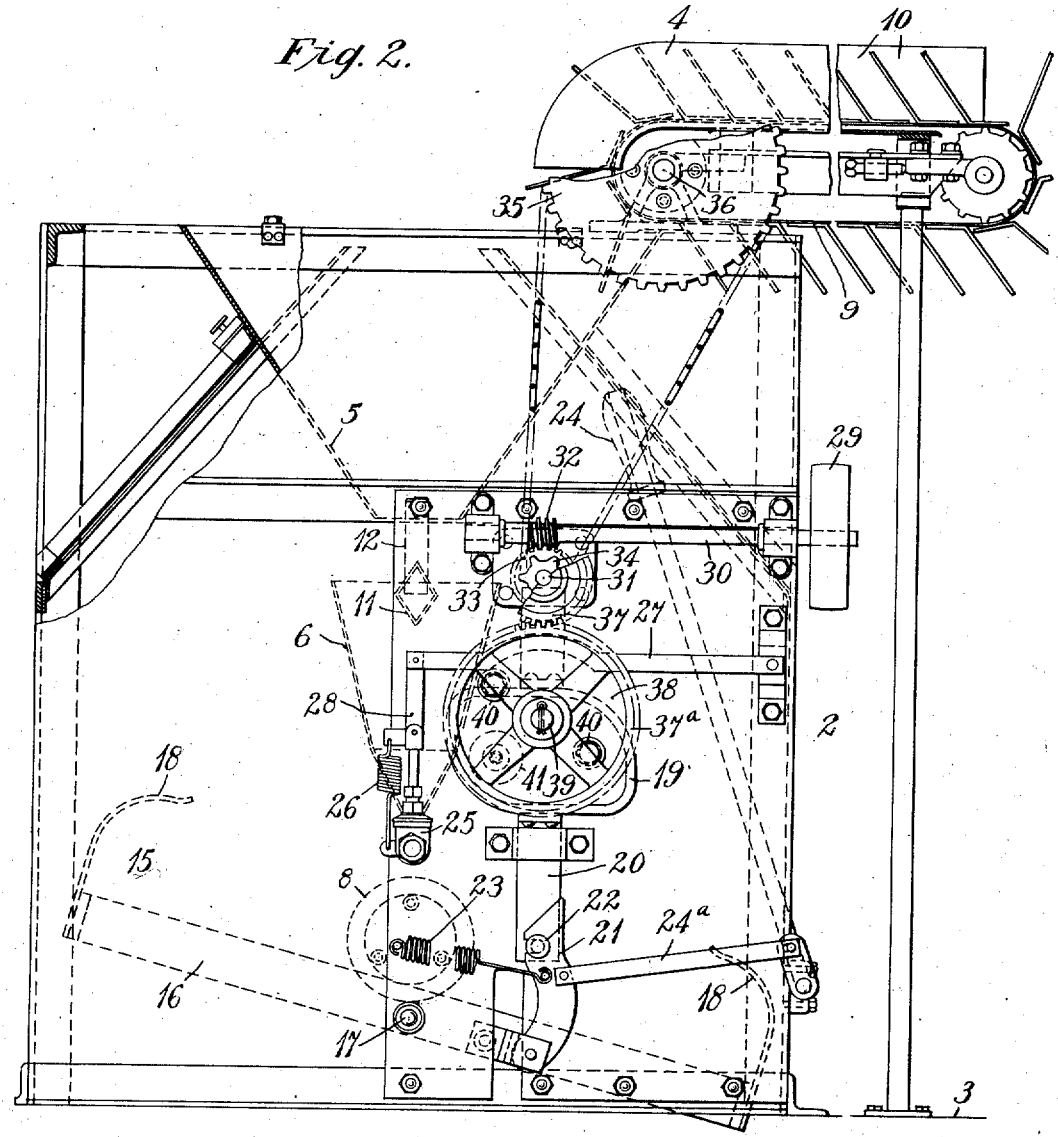

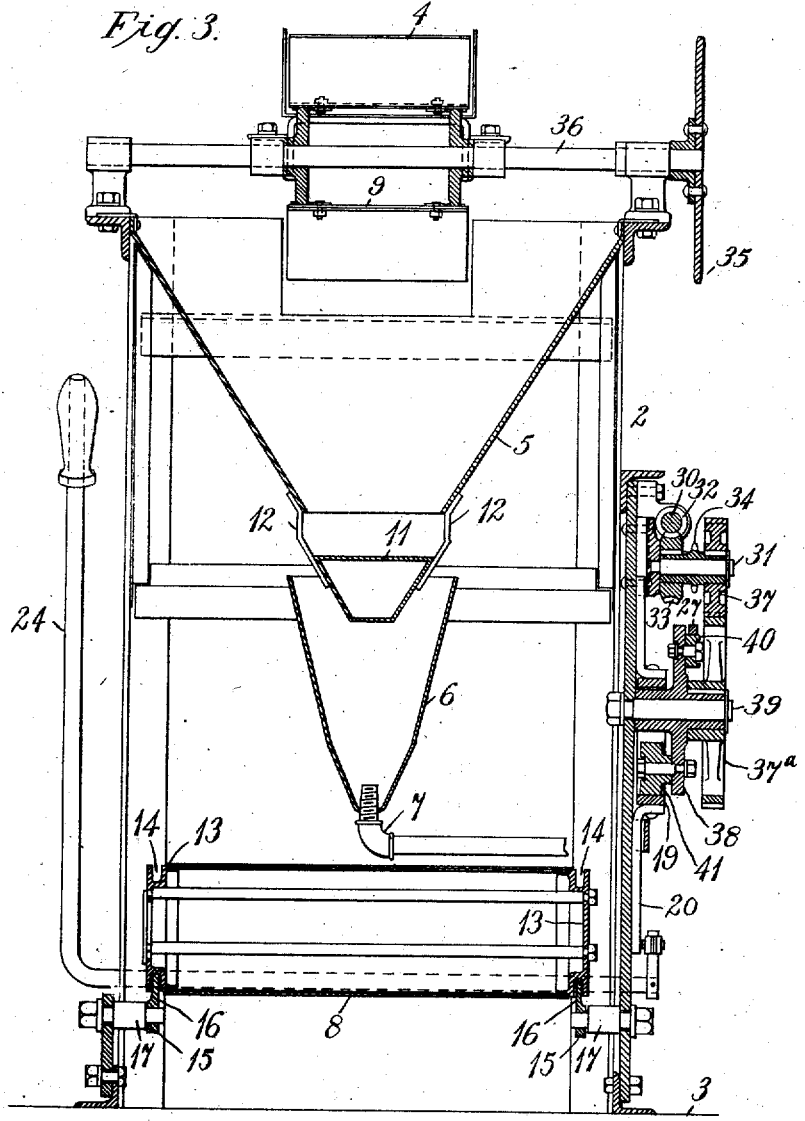

UNITED STATES PATENT OFFICE.

JOHN R. SANBORN, OF PITTSBURGH, PENNSYLVANIA, ASSIGNOR TO WESTINGHOUSE ELECTRIC AND MANUFACTURING COMPANY, A CORPORATION OF PENNSYLVANIA.

MICA-BUILDING MACHINE.

1,074,576. Specification of Letters Patent. Patented Sept. 30, 1913.

Application filed August 10, 1910, Serial No. 576,578. Renewed May 14, 1912. Serial No. 697,304.

*To all whom it may concern:*

Be it known that I, JOHN R. SANBORN, a citizen of the United States, and a resident of Pittsburgh, in the county of Allegheny and State of Pennsylvania, have invented a new and useful Improvement in Mica-Building Machines, of which the following is a specification.

My invention relates to the manufacture of composite insulating sheets and it has special reference to the manufacture of insulating sheets composed of mica flakes and a binding material or bond.

The object of my invention is to provide automatic means for building up mica insulation of uniform thickness and excellence, with a minimum expenditure of labor and material.

While it is a particularly tedious and expensive process to build sheet mica insulation by hand, this method has been found preferable to the use of any automatic machines heretofore devised, because of the great difficulties encountered in attempting to secure a uniform distribution of mica flakes over a plate or apron by any other than manual means. Other difficulties have arisen, in attempting to handle liquid binders, such as shellac, in automatic machines by reason of the tendency for the liquid to harden and clog the outlets from which it was intended to be discharged.

According to my present invention, I overcome the difficulties of the prior art by providing a machine embodying the following essential features: First; a feed mechanism for delivering a measured amount of mica flakes to the hopper of the machine: second; an ejector consisting, preferably, of a nozzle or nozzles, a fan, or other pneumatic means, arranged to eject the mica flakes from the hopper: third; a distributing mechanism for disassociating the mica flakes as they are ejected from the hopper and distributing them in the tower in which the aforesaid parts are located: fourth; a device for distributing the bond in powder form over the flakes which are deposited upon a plate or receiving surface at the bottom of the tower: fifth; a tower of such height and cross section as to allow the mica flakes, which are delivered to it from the distributing mechanism, to fall in a perfectly disassociated well distributed shower upon the plate at the bottom, in an even layer.

It has been found that if mica flakes are properly delivered or discharged in a thoroughly disassociated condition at the top of a tower of considerable height, they will distribute themselves evenly over a plate or templet at the bottom of the tower. On the other hand, the dry bond, which is in the form of powder, is adapted to drop downwardly in vertical lines, and, consequently, it is essential to provide suitable means for properly distributing the same.

Figure 1 of the accompanying drawings is a partially sectional elevation of a machine constructed in accordance with my invention, and Figs. 2 and 3, are, respectively, a side and a sectional elevation, on a larger scale, of the top portion of the machine shown in Fig. 1.

Referring to the drawings, the structure here shown comprises a tower 1, having a top member 2, which is preferably located above the floor line 3 of a balcony or platform and comprises a conveyer 4, a receiving hopper 5, and distributing hopper 6, an ejector 7, a cylindrical sieve or bond distributer 8 and suitable operating mechanism therefor. The conveyer 4 comprises a continuous belt or chain 9 having a plurality of pockets or buckets 10, to which measured quantites of mica flakes may be supplied. The arrangement of parts is such that the contents of the pockets are successively emptied into the receiving hopper 5.

A deflector 11 is suspended from the bottom of the hopper 5 by means of straps 12, and is of substantially diamond-shape in transverse section, as shown in Fig. 2 of the drawings. The discharging hopper 6 is directly below the outlet of the receiving hopper 5, the deflector 11 being located in its mouth. The ejector 7 is located at the bottom of the hopper 6, the arrangement of parts being such that mica flakes fall from the hopper 5 into the hopper 6 and are forced upwardly and outwardly therefrom into the tower when compressed air is discharged from the ejector 7, the deflector 11 serving to prevent the flakes from returning into the hopper 5.

The dry bond distributer 8 comprises a cylindrical sieve which extends completely across the tower and is provided with end disks 13 having annular grooves 14 which rest on the side bars 16 of a frame or guide member 15. The side bars 16 are pivotally supported, at substantially their middle points, upon studs 17 and are provided with end springs 18, or other suitable means, for limiting the degree of movement of the cylindrical sieve.

In order to so oscillate the frame 15 as to insure a proper distribution of dry bond, I provide a cam 19 and a vertical rod or bar 20 to the lower end of which the frame 15 is connected by means of a latch 21 and a pin 22, the latch and pin being normally held in engagement by means of a spring 23. If it is desired to operate the frame 15 manually, or to prevent the continued oscillation thereof, the latch 21 may be withdrawn from the pin 22 by means of a handle 24 which is outside the tower and is connected to the latch by a link 24ª.

The ejector 7 is provided with a valve 25 which is normally closed by a spring 26 and, during the operation of the device, is intermittently opened by a means which will hereinafter be described.

As shown in the drawings, the mechanism, including the conveyer, is driven by power from some suitable source which is applied to a pulley 29 on a shaft 30 which drives a jack shaft 31 through a worm 32 and a worm wheel 33. The jack shaft 31 is provided with a sprocket wheel 34 which drives a sprocket wheel 35 on the conveyer shaft 36 and with a pinion 37 which meshes with a gear wheel 37ª upon a shaft or stud 39.

A disk 38, which is mounted upon the stud 39 and rigidly connected to the gear wheel 37ª, is provided with projections 40 which each engage a lever 27 once in every revolution and thereby raises a link 28 to open the valve 25. The other side of the member 38 is provided with a projection 41 which engages a cam 19 to effect reciprocation of the rod or bar 20. The cam 19 is oblong in shape and has two diagonally opposite corners which are slightly rounded and two intermediate corners which are deeply rounded, so that the rod 20, to which the cam 19 is secured, reciprocates through two complete cycles for each revolution of the disk 38.

A templet, or receiving plate, 42 is provided, at a convenient distance above the floor line, near the bottom of the tower, a door 43 being provided in one wall of the tower for the purpose of inserting a sheet of paper, or other material on which the mica flakes are to be deposited and for withdrawing the composite sheet after it is formed.

In order to withdraw the composite sheet without disturbing the relative position of the flakes, I prefer to employ a truck or carrier 44, as shown in Fig. 1, having a table 45, the height of which may be adjusted to accommodate it to that of the templet 42.

The operation of the device is as follows: Assuming that a predetermined number of pockets 10 of the conveyer are filled with just the proper quantities of mica flakes and that the mechanism is being driven by power applied to the pulley 29, when the flakes in the first pocket are emptied into the hopper 5, they will fall therefrom into the hopper 6. Just as they are all settled into the hopper, the valve 25 of the ejector 7 is opened in opposition to the spring 26 and a blast of compressed air is admitted to the hopper. The air blast is sufficient to force all the flakes out of the hopper and the deflector 11 deflects them outwardly into the upper end of the tower. The action of the air is such that the flakes are completely separated from each other and fall in a well-distributed shower. The sieve 8 is rolled back and forth across the tower, as the frame 15 is tilted by the cam 19, and showers the powdered bond beneath and upon the mica flakes. This process is continued until all of the pockets of the conveyer are empty, just enough pockets being filled to make the desired number of layers for a single insulating sheet.

Upon the completion of the foregoing steps of the process, the door 43 is opened, the composite sheet is carefully withdrawn and is placed between two sheet iron plates which hold the parts in position on the table 45 of the truck. The process is repeated a number of times until the truck is loaded with alternate layers of sheet iron and assembled composite sheets, when the whole is removed to a press having hot pressure plates and there subjected to sufficient heat and pressure to melt the dry binder and to thoroughly seal the mica flakes together into a solid sheet of uniform thickness.

The commercial use of my device has been effective in expediently producing insulating sheets of excellent quality and uniform thickness.

Structural modifications may, of course, be effected within the spirit and scope of my invention, and the invention may be utilized for manipulating other materials than those specifically mentioned.

I claim as my invention:

1. The combination with a tower, of a hopper at the upper end of the tower for receiving flake material and an ejector for disassociating the flakes and forcing them upwardly out of the hopper, whereby they are permitted to fall to the bottom of the tower in a uniformly distributed shower.

2. The combination with a tower, and a hopper at its upper end, of a deflector in the mouth of the hopper and means for ejecting flake material upwardly and outwardly from the hopper into the upper end of the tower.

3. The combination with a tower, a receiving hopper at the upper end of the tower, and a distributing hopper below the receiving hopper, of a deflector in the mouth of the distributing hopper and pneumatic means for forcing flake material upwardly out of the distributing hopper into the tower.

4. The combination with a tower, a hopper, and means for ejecting flake material from the hopper into the upper end of the tower, of means for evenly distributing a layer of powdered bond among and upon said flake material.

5. The combination with a tower, a hopper, and means for ejecting insulating flakes from the hopper into the upper end of the tower, of means for sifting powdered insulating bond upon said flakes after they are ejected from the hopper without interrupting the free downward movement thereof.

6. The combination with a tower, a hopper, and means for ejecting insulating flakes from the hopper into the upper end of the tower, of a cylindrical sieve containing powdered insulating bond and means for rolling the sieve back and forth across the tower, whereby alternate layers of flakes and powdered bond are deposited at the bottom of the tower.

7. The combination with a tower, a hopper, of an ejector associated with the hopper for discharging flake material therefrom into the tower, and means for intermittently actuating the ejector.

8. The combination with a tower, a hopper and an ejector associated with the hopper for discharging flake material therefrom into the tower, of a cylindrical sieve containing powdered bond, a frame upon which the sieve is supported and automatic means for alternately actuating the ejector and tilting the frame, whereby alternate layers of flake material and powdered bond are deposited at the bottom of the tower.

9. The combination with a receiving hopper, and a conveyer having a plurality of buckets for delivering flake material to the receiving hopper, of a distributing hopper below the receiving hopper, an ejector and means for intermittently actuating the ejector to successively discharge predetermined quantities of flake material into the tower as it is received from the conveyer buckets.

10. The combination with a tower having a receiving hopper at its upper end, a conveyer having a plurality of buckets containing flake material to be successively discharged into the receiving hopper, and a discharging hopper directly below the receiving hopper, of a deflector in the mouth of the discharging hopper, an ejector associated with the discharging hopper, a sieve containing powdered insulating bond, and automatic means for alternately actuating the ejector and the sieve to discharge insulating bond and a predetermined quantity of flakes as they are received from the conveyer buckets, whereby alternate layers of powdered bond and flakes are deposited at the bottom of the tower.

11. The combination with a tower, a hopper having an upwardly directed discharge opening, of an ejector associated with the hopper, for discharging flake material from the discharge opening of the hopper into the top of the tower.

12. The combination with a tower, and means for discharging flakes into the tower, of means for distributing a powdered bond over the flakes, whereby alternate layers of flakes and powdered bond are deposited at the bottom of the tower.

13. The combination with a hopper located in an inclosed space, of means for forcing flake material upwardly out of the hopper into the inclosed space.

14. The combination with a hopper located in an inclosed space, and means for feeding flake material thereto, of means for ejecting said material upwardly out of the hopper into the inclosed space.

15. The combination with a hopper located in an inclosed space, and means for feeding successive charges of flake material into said hopper, of means for ejecting the successive charges of material upwardly out of the hopper to fall as showers in the inclosed space.

16. The combination with a hopper located in an inclosed space, and means for feeding successive charges of flake material into said hopper, of means for ejecting the material from the hopper in successive showers, and means for discharging successive showers of powdered bond into said inclosed space.

17. The combination with a hopper located in an inclosed space, and means for supplying successive charges of flake material thereto, of means for ejecting the successive charges of material from said hopper, and means for discharging successive showers of dry bond into said inclosed space.

18. The combination with a hopper located in an inclosed space, and means for supplying successive charges of flake material to said hopper, of means for ejecting the charges of material from said hopper to form successive showers in said inclosed space, and means for discharging showers of comminuted dry bond into said inclosed space in alternation with said showers of flake material.

19. The combination with a hopper located in an inclosed space, and means for ejecting successive showers of flake material therefrom, of means for discharging successive showers of comminuted dry bond into said inclosed space in alternation with said showers of flake material.

20. The combination with a hopper located in an inclosed space, and means for ejecting flake material upwardly out of said hopper to form successive showers, of means for discharging comminuted dry bond into said inclosed space in successive showers that alternate with the showers of flake material.

In testimony whereof, I have hereunto subscribed my name this 20th day of July, 1910.

JOHN R. SANBORN.

Witnesses:
R. J. DEARBORN,
B. B. HINES.

---

Copies of this patent may be obtained for five cents each, by addressing the "Commissioner of Patents, Washington, D. C."

---

It is hereby certified that in Letters Patent No. 1,074,576, granted September 30, 1913, upon the application of John R. Sanborn, of Pittsburgh, Pennsylvania, for an improvement in "Mica-Building Machines," an error appears in the printed specification requiring correction as follows: Page 3, line 80, strike out the words "top of the"; and that the said Letters Patent should be read with this correction therein that the same may conform to the record of the case in the Patent Office.

Signed and sealed this 18th day of November, A. D., 1913.

[SEAL.]

R. T. FRAZIER,
*Acting Commissioner of Patents.* ejecting successive showers of flake material therefrom, of means for discharging successive showers of comminuted dry bond into said inclosed space in alternation with said showers of flake material.

20. The combination with a hopper located in an inclosed space, and means for ejecting flake material upwardly out of said hopper to form successive showers, of means for discharging comminuted dry bond into said inclosed space in successive showers that alternate with the showers of flake material.

In testimony whereof, I have hereunto subscribed my name this 20th day of July, 1910.

JOHN R. SANBORN.

Witnesses:
R. J. DEARBORN,
B. B. HINES.

---

Copies of this patent may be obtained for five cents each, by addressing the "Commissioner of Patents, Washington, D. C."

---

It is hereby certified that in Letters Patent No. 1,074,576, granted September 30, 1913, upon the application of John R. Sanborn, of Pittsburgh, Pennsylvania, for an improvement in "Mica-Building Machines," an error appears in the printed specification requiring correction as follows: Page 3, line 80, strike out the words "top of the"; and that the said Letters Patent should be read with this correction therein that the same may conform to the record of the case in the Patent Office.

Signed and sealed this 18th day of November, A. D., 1913.

[SEAL.]

R. T. FRAZIER,
*Acting Commissioner of Patents.*

Correction in Letters Patent No. 1,074,576.

It is hereby certified that in Letters Patent No. 1,074,576, granted September 30, 1913, upon the application of John R. Sanborn, of Pittsburgh, Pennsylvania, for an improvement in "Mica-Building Machines," an error appears in the printed specification requiring correction as follows: Page 3, line 80, strike out the words "top of the"; and that the said Letters Patent should be read with this correction therein that the same may conform to the record of the case in the Patent Office.

Signed and sealed this 18th day of November, A. D., 1913.

[SEAL.]

R. T. FRAZIER,
*Acting Commissioner of Patents.*